(12) United States Patent
Bajpai et al.

(10) Patent No.: US 11,188,490 B1
(45) Date of Patent: Nov. 30, 2021

(54) SYSTEMS AND METHODS FOR SWITCHING A CONSOLE CONNECTION BETWEEN CPUS

(71) Applicant: Cisco Technology, Inc., San Jose, CA (US)

(72) Inventors: Mridul Bajpai, Brentwood, CA (US); Hsi-Wen Chen, Fremont, CA (US); Mete Yilmaz, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/809,289

(22) Filed: Mar. 4, 2020

Related U.S. Application Data

(60) Provisional application No. 62/945,969, filed on Dec. 10, 2019.

(51) Int. Cl.
| | | |
|---|---|---|
| *G06F 13/40* | (2006.01) | |
| *G06F 13/38* | (2006.01) | |
| *G06F 15/17* | (2006.01) | |
| *G06F 9/50* | (2006.01) | |

(52) U.S. Cl.
CPC ........ G06F 13/4022 (2013.01); G06F 9/5027 (2013.01); G06F 13/385 (2013.01); G06F 15/17 (2013.01)

(58) Field of Classification Search
CPC ........................... G06F 13/4022; G06F 13/385
See application file for complete search history.

(56) References Cited

U.S. PATENT DOCUMENTS

| | | |
|---|---|---|
| 6,647,508 B2 | 11/2003 | Zalewski et al. |
| 6,856,600 B1 | 2/2005 | Russell et al. |
| 7,441,066 B2 | 10/2008 | Bouchier et al. |
| 8,601,053 B2 | 12/2013 | Mehrotra et al. |
| 9,747,183 B2 | 8/2017 | Bhattacharya et al. |
| 10,069,688 B2 | 9/2018 | Atyam et al. |
| 10,133,619 B1 | 11/2018 | Nagpal et al. |
| 10,511,546 B2 | 12/2019 | Singarayan et al. |
| 2003/0188049 A1* | 10/2003 | Dickens ................ G06F 3/0227 710/8 |
| 2006/0095644 A1* | 5/2006 | Fujita .................. G06F 13/4027 710/313 |
| 2009/0094395 A1* | 4/2009 | Shen ...................... G06F 3/023 710/74 |
| 2010/0306424 A1* | 12/2010 | Akester ................... G06F 3/023 710/36 |
| 2011/0057881 A1* | 3/2011 | Wen ........................ G06F 3/023 345/163 |

(Continued)

FOREIGN PATENT DOCUMENTS

CN          106445855 B     2/2019

*Primary Examiner* — David E Martinez
(74) *Attorney, Agent, or Firm* — Baker Botts, LLP

(57) ABSTRACT

In one embodiment, a method includes establishing a connection between a hardware switch and a console port, connecting the console port to a first central processing unit (CPU) using the hardware switch, and receiving, from the console port, a first character stream. The method also includes detecting, by the hardware switch, a first special character within the first character stream. The method further includes connecting, by the hardware switch, the console port to a second CPU in response to detecting the first special character within the first character stream.

20 Claims, 3 Drawing Sheets

(56) References Cited

U.S. PATENT DOCUMENTS

| | | | |
|---|---|---|---|
| 2013/0050084 A1* | 2/2013 | Soffer | G06F 21/85 345/163 |
| 2016/0147691 A1* | 5/2016 | Huang | G06F 3/0227 710/65 |
| 2019/0327126 A1 | 10/2019 | Rivaud et al. | |

* cited by examiner

SYSTEMS AND METHODS FOR SWITCHING A CONSOLE CONNECTION BETWEEN CPUS

CROSS-REFERENCE TO RELATED APPLICATIONS

This application claims benefit of U.S. Provisional Application No. 62/945,969 filed Dec. 10, 2019, by Mridul Bajpai et al., and entitled "Hardware-Based Physical Console Sharing for AMP Systems," which is incorporated herein by reference.

TECHNICAL FIELD

This disclosure generally relates to switching a console connection, and more specifically to systems and methods for switching a console connection between central processing units (CPUs).

BACKGROUND

Asymmetric multiprocessing (AMP) systems include two or more CPUs. The CPUs work independent of each other. For example, each CPU may perform a different task such as executing operating system code or performing input/output (I/O) operations. Debugging an AMP system may require a console connection to each CPU. The console connections are typically accommodated by ports located on a front panel of the console. However, the front panel may not be able to accommodate multiple console connections due to space limitations or other reasons.

DESCRIPTION OF EXAMPLE EMBODIMENTS

Overview

Figure 1:
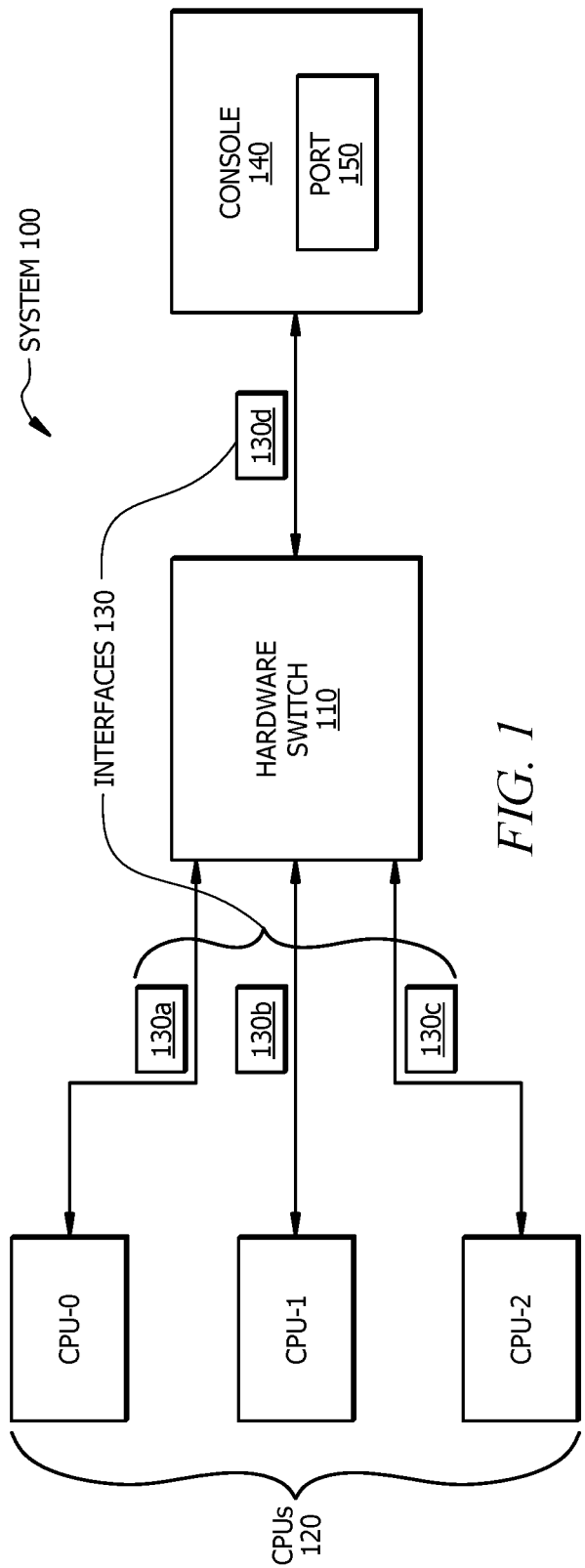
FIG. 1 illustrates an example system for switching a console connection between CPUs.

According to an embodiment, a hardware switch includes one or more processors and one or more computer-readable non-transitory storage media coupled to the one or more processors. The one or more computer-readable non-transitory storage media include instructions that, when executed by the one or more processors, cause the hardware switch to perform operations including establishing a connection between the hardware switch and a console port, connecting the console port to a first central processing unit (CPU), and receiving, from the console port, a first character stream. The operations also include detecting a first special character within the first character stream. The operations further include connecting, in response to detecting the first special character within the first character stream, the console port to a second CPU.

In some embodiments, the operations include receiving, from the console port, a second character stream, detecting the first special character within the second character stream, and connecting, in response to detecting the first special character within the second character stream, the console port to a third CPU. In certain embodiments, the third CPU is the first CPU.

In some embodiments, the operations include changing the first special character to a second special character, receiving, from the console port, a second character stream, detecting the second special character within the second character stream, and connecting, in response to detecting the second special character within the second character stream, the console port to a third CPU.

In certain embodiments, the operations include communicating, after connecting the console port to the second CPU, with the second CPU using a serial terminal interface. The serial terminal interface may be a universal asynchronous receiver-transmitter (UART). In some embodiments, the hardware switch is part of an asymmetric multi-processing system.

According to another embodiment, a method includes establishing a connection between a hardware switch and a console port, connecting the console port to a first CPU using the hardware switch, and receiving, from the console port, a first character stream. The method also includes detecting, by the hardware switch, a first special character within the first character stream. The method further includes connecting, by the hardware switch, the console port to a second CPU in response to detecting the first special character within the first character stream.

According to yet another embodiment, one or more computer-readable non-transitory storage media embody instructions that, when executed by a processor, cause the processor to perform operations including establishing a connection between a hardware switch and a console port, connecting the console port to a first CPU, and receiving, from the console port, a first character stream. The operations also include detecting a first special character within the first character stream. The operations further include connecting, in response to detecting the first special character within the first character stream, the console port to a second CPU.

Technical advantages of certain embodiments of this disclosure may include one or more of the following. Embodiments of this disclosure share a single serial console connection between two or more CPUs of a system (e.g., an AMP system). Due to the increasing port density on devices (e.g., routers and servers), the front panel space on certain controller cards has become premium real estate. Console ports may be necessary to initially configure and/or debug the CPUs. However, it is becoming more difficult to accommodate enough console ports on the devices due to the increasing density of data ports. This disclosure provides systems and methods for sharing a console port between multiple CPUs on the system, which saves front panel space without compromising the debugging abilities of the device. The systems and methods described herein may be used to debug early boot failures of any CPU in the system.

In certain embodiments of this disclosure, a hardware element is used to switch the console connection to a different CPU upon detecting a special character. Because a hardware element is used to switch the console connection to a different CPU, the switching process is immune to software failures. In certain embodiments, the hardware element is available as soon as the system is powered up and hence provides console access as desired to any of the CPUs in the system. The hardware element may be field programmable so that the special character can be changed if desired. The methods disclosed herein may share a single console connection to monitor the health of AMP systems and automatically recover from faults.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for switching a single console connection between multiple CPUs. In computer devices (e.g., routers, servers, etc.) that include a baseboard management controller (BMC) and a host CPU complex, the BMC CPU intercepts the user-provided character stream and uses a special character to switch the console to the BMC CPU or the host CPU of the device. Since the interception of the console character stream is performed in software, this method is dependent on the BMC software working correctly. If BMC is not operating correctly or is rebooting, the user cannot connect to the host CPU console. The disclosure provides a hardware element that can snoop the character stream input by the user. If a pre-determined special character is detected, the hardware element switches the console connection from a first CPU to a second CPU.

Figure 2:
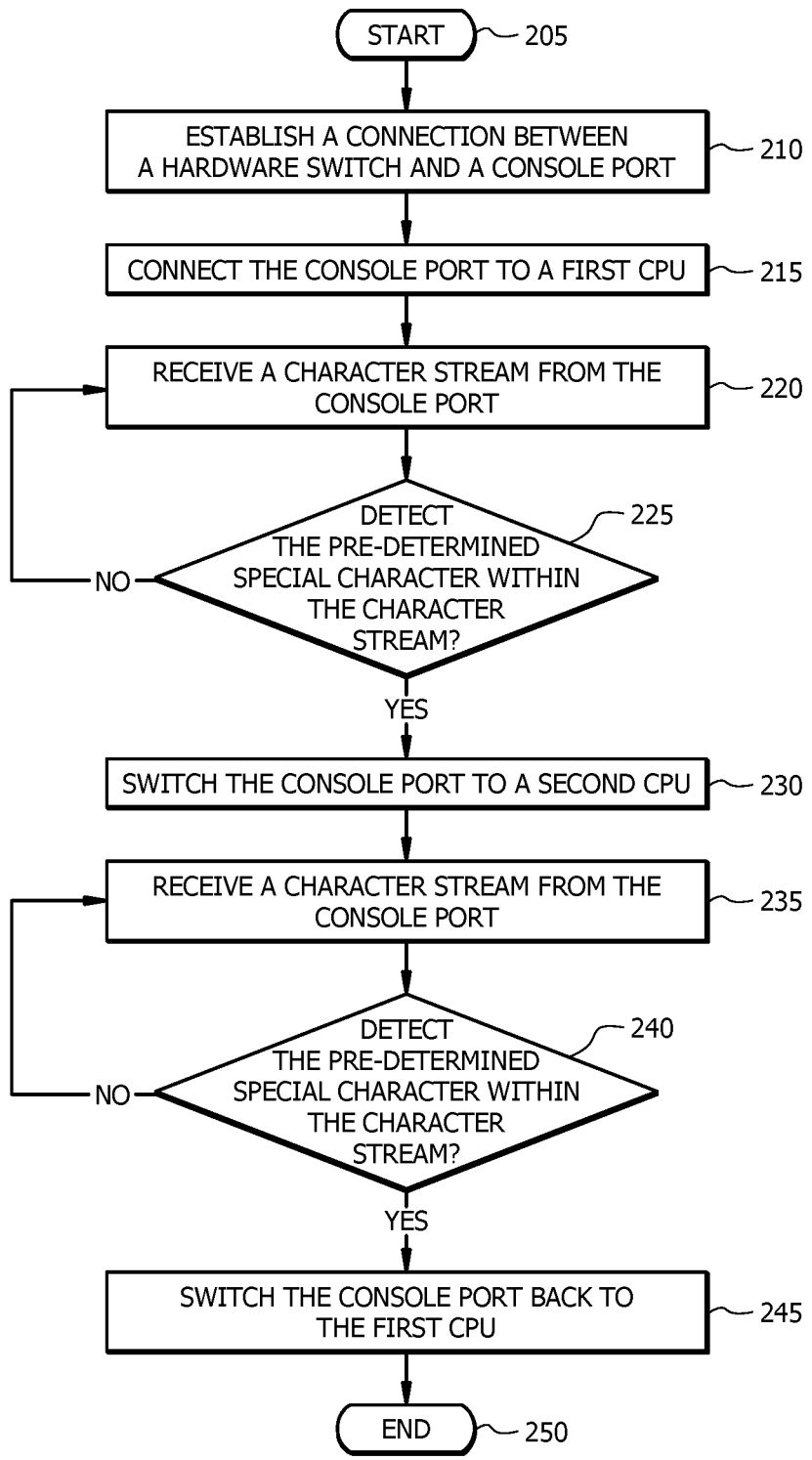
FIG. 2 illustrates an example method for switching a console connection between CPUs.
Figure 3:
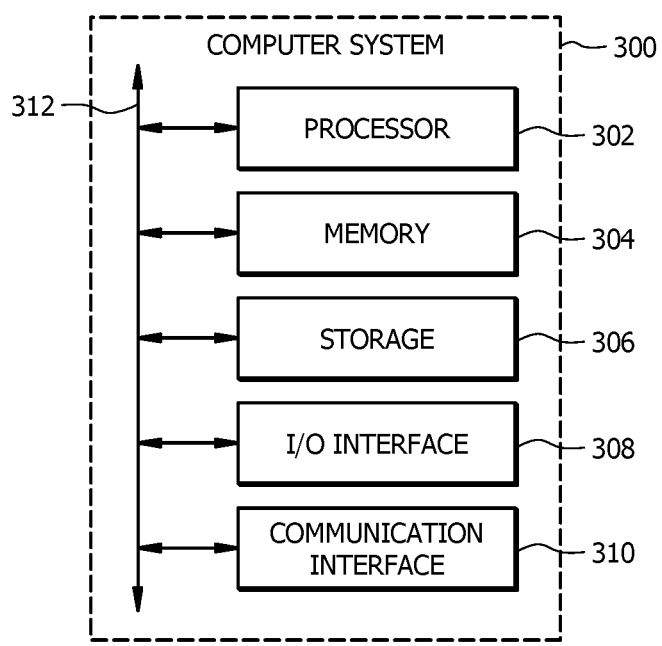
FIG. 3 illustrates an example computer system that may be used by the systems and methods described herein.

Certain embodiments of this disclosure describe systems and methods for switching a console connection between CPUs. FIG. 1 shows an example system for switching a console connection between CPUs, and FIG. 2 shows an example method for switching a console connection between CPUs. FIG. 3 shows an example computer system that may be used by the systems and methods described herein.

FIG. 1 illustrates an example system 100 for switching a console connection between CPUs 120. System 100 or portions thereof may be associated with an entity, which may include any entity, such as a business or company, that provides or uses hardware components that switch a console connection between CPUs. System 100 may be any system that includes multiple CPUs. For example, system 100 may be a shared memory multiprocessor system, a distributed memory multiprocessor system, an AMP system, a symmetric multiprocessing (SMP) system, a supervised AMP system, and the like. In the illustrated embodiment of FIG. 1, system 100 is an AMP system. An AMP system is a system that includes multiple, interconnected CPUs that are treated unequally. The components of system 100 may include any suitable combination of hardware, firmware, and software. For example, the components of system 100 may use one or more elements of the computer system of FIG. 3.

System 100 includes a hardware switch 110, CPUs 120 (i.e., CPU-0, CPU-1, and CPU-2), interfaces 130, a console 140, and a port 150. Hardware switch 110 of system 100 is any physical circuitry component that governs signal flow. Hardware switch 110 allows a connection to be opened or closed. When opened, hardware switch 110 allows a signal or power to flow through the connection. When closed, hardware switch 110 stops the flow and breaks the circuit connection. Hardware switch 110 manages the flow of data across system 100 by transmitting data received via port 150 of console 140 to CPUs 120.

In the illustrated embodiment of FIG. 1, hardware switch 110 connects console 140 to each CPU 120 in turn. For example, hardware switch 110 may connect console 150 to CPU-0. Upon detecting a special character, hardware switch 110 may switch the connection from CPU-0 to CPU-1. Upon detecting the special character a second time, hardware switch 110 may switch the connection from CPU-1 to CPU-2. Upon detecting the special character a third time, hardware switch 110 may switch the connection from CPU-2 back to CPU-1.

In certain embodiments, the special character may be a default character that is initially programmed into hardware switch 110. The special character may be a single character or a string of characters. The special character should be esoteric enough so that the special character does not interfere with the normal text entered by a user which is accepted by applications running on CPUs 120. Hardware switch 110 may be field programmable so that the special character can be changed if desired. For example, the special character may be changed from a first special character (e.g., the default special character) to a second special character. In certain embodiments, the special character is a key sequence. A key sequence is a series of keyboard keystrokes, mouse actions, menu actions, and the like. For example, the key sequence may be a sequence of keyboard key pressings and releases (e.g., control-O).

In certain embodiments, hardware switch 110 receives a character stream from console 140. For example, a peripheral device (e.g., a keyboard or a mouse) may be connected to port 150 of console 140. A user may input a character stream into the peripheral device, and hardware switch 110 receives the character stream input by the user. Hardware switch 110 is programmed to snoop the character stream for the special character. Upon detecting the special character in a character stream, hardware switch 110 switches the connection to the next CPU 120.

Upon detecting the special character, hardware switch 110 may be programmed to switch the connection to the next CPU 120 in a particular order. In certain embodiments, hardware switch 110 is programmed to switch the connection to the next CPU 120 in ascending order and, upon reaching the highest numbered CPU 120, start over. For example, hardware switch may initially connect to CPU-0, switch to CPU-1 upon detecting the special character a first time, switch to CPU-2 upon detecting the special character a second time, and switch back to CPU-0 upon detecting the special character a third time. In some embodiments, hardware switch 110 is programmed to switch the connection to the next CPU in descending order and, upon reaching the lowest numbered CPU 120, start over. For example, hardware switch may initially connect to CPU-2, switch to CPU-1 upon detecting the special character a first time, switch to CPU-0 upon detecting the special character a second time, and switch back to CPU-2 upon detecting the special character a third time. Hardware switch 110 may be programmed to switch the connection to the next CPU 120 in any suitable fashion.

CPUs 120 of system 100 include CPU-0, CPU-1 and CPU-2. Each CPU 120 is the electronic circuitry that executes instructions that make up a computer program. CPUs 120 perform basic arithmetic, logic, controlling, and/or I/O operations specified by the instructions. Each CPU 120 includes a processing unit and control unit. CPUs 120 may run multiple processes (e.g., number crunching, vector processing, signal processing, video raster graphics, etc.). Each CPU 120 of system 100 may be treated differently. For example, CPU-0 may execute operating system code, CPU-1 may perform I/O operations, and so on. While the illustrated embodiment of FIG. 1 includes three CPUs 120, system 100 may include any suitable number of CPUs 120. In the illustrated embodiment of FIG. 1, CPUs 120 communicate with hardware switch 110 via interfaces 130.

Interfaces 130 of system 100 are devices that connect two components of system 100 to each other. Interfaces 130 facilitate communication between hardware switch 110, CPUs 120, and console 140. Interfaces 130 include interface 130a, interface 130b, interface 130c, and interface 130d. In the illustrated embodiment of FIG. 1, hardware switch 110 communicates with CPU-0 using interface 130a, hardware switch 110 communicates with CPU-1 using interface 130b, hardware switch 110 communicates with CPU-2 using interface 130c, and hardware switch 110 communicates with console 140 using interface 130d.

In certain embodiments, one or more interfaces 130 are serial terminal interfaces. Serial terminal interfaces are communication interfaces that transmit data as a single stream of bits. One or more interfaces 130 may be a universal asynchronous receiver-transmitter (UART). A UART is a computer hardware device for asynchronous serial communication in which the data format and transmission speeds are configurable. In certain embodiments, the UART is an integrated circuit (IC), or a portion thereof, used for serial communications. One or more UART peripherals may be integrated in microcontroller chips.

Console 140 of system 100 is a physical component that accommodates one or more ports 150. Console 140 may be located on the front or back of a computer. In certain embodiments, console 140 includes a panel (e.g., a front panel) that accommodates one or more ports 150, buttons, switches, dials, and the like. Port 150 of system is a connection point located on console 140. Port 150 allows one or more components of system 100 (e.g., hardware switch 110) to access external devices. Port 150 serves as an interface between console 140 and other computers or peripheral devices (e.g., a keyboard, a mouse, a monitor, a webcam, speakers, flash drives, etc.). In certain embodiments, port 150 is an outlet (e.g., a hole) on console 140 to which a plug or cable connects. For example, a user may connect a peripheral device to port 150 via a cable. Port 150 may be a serial port (e.g., a DB-25, a DE-9, etc.), a parallel port, an audio port, a video port, a display port, a High Definition Media Interface (HDMI), a Universal Serial Bus (USB), and the like. In the illustrated embodiment of FIG. 1, port 150 is a serial port.

In addition to the components shown in FIG. 1, system 100 may include any type of network that facilitates communication between components of system 100. One or more networks of system 100 may connect one or more components of system 100. This disclosure contemplates any suitable network. One or more portions of any network of system 100 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. One or more networks of system 100 may be a communications network, such as a private network, a public network, a connection through Internet, a mobile network, a WI-FI network, a cloud network, etc. One or more components of system 100 may communicate over one or more networks of system 100.

In operation, hardware switch 110 is connected to port 150 of console 140 using interface 130d. Hardware switch 110 connects port 150 of console 140 to CPU-0 using interface 130a. A user inputs a first character stream into a periphery device (e.g., a keyboard) that is connected to port 150. Hardware switch 110 receives the first character stream from port 150 of console 140 and detects a special character (e.g., CTRL-O) within the first character stream. In response to detecting the special character within the first character stream, hardware switch 110 connects port 150 of console 140 to CPU-1 using interface 130b. A user inputs a second character stream into the periphery device that is connected to port 150. Hardware switch 110 receives the second character stream from port 150 of console 140 and detects the special character within the second character stream. In response to detecting the special character within the second character stream, hardware switch 110 connects port 150 of console 140 to CPU-2 using interface 130c. A user then inputs a third character stream into the periphery device that is connected to port 150. Hardware switch 110 receives the third character stream from port 150 of console 140 and detects the special character within the third character stream. In response to detecting the special character within the third character stream, hardware switch 110 connects port 150 of console 140 back to CPU-0 using interface 130a. As such, system 100 may be used to debug early boot failures of any CPU 120 in system 100.

Although FIG. 1 illustrates a particular arrangement of hardware switch 110, CPUs 120, interfaces 130, console 140, and port 150, this disclosure contemplates any suitable arrangement of hardware switch 110, CPUs 120, interfaces 130, console 140, and port 150. Although FIG. 1 illustrates a particular number of hardware switches 110, CPUs 120, interfaces 130, consoles 140, and ports 150, this disclosure contemplates any suitable number of hardware switches 110, CPUs 120, interfaces 130, consoles 140, and ports 150. For example, system 100 may include more or less than three CPUs 120.

FIG. 2 illustrates an example method 200 for switching a console connection between CPUs. Method 200 begins at step 205. At step 210, a connection is established between a hardware switch (e.g., hardware switch 110 of FIG. 1) and a port (e.g., port 150 of FIG. 1) of a console (e.g., console 140 of FIG. 1). In illustrated method 200 of FIG. 2, the hardware switch and the console port are part of an AMP system having two CPUs (e.g., CPU-0 and CPU-1 of FIG. 1). The connection between the hardware switch and the console port is established using an interface (e.g., interface 130d of FIG. 1). The interface may be a serial terminal interface such as a UART. Method 200 then moves from step 210 to step 215, where the hardware switch connects the console port to a first CPU (e.g., CPU-0 of FIG. 1). The connection between the hardware switch and the first CPU is established using an interface (e.g., interface 130a of FIG. 1). The interface may be a serial terminal interface such as a UART. Method 200 then moves from step 215 to step 220.

At step 220 of method 200, the hardware switch receives a character stream from the console port. For example, a user may input the character stream into a periphery device (e.g., a keyboard) that is connected to the console port, and the hardware switch may intercept the character stream. Method 200 then moves from step 220 to step 225, where the hardware switch determines whether the character stream includes a pre-determined special character. The special character may be a key sequence such as a function (e.g., CTRL-O). If the hardware switch detects the special character within the character stream, method 200 moves from step 225 to step 230. If, at step 225, the hardware switch does not detect the special character within the character stream, method 200 moves back to step 220, where the hardware switch continues to receive character streams until the hardware switch detects the special character within the character stream. Method 200 then moves from step 225 to step 230.

At step 230, the hardware switch switches the console port connection from the first CPU to the second CPU (e.g., CPU-1 of FIG. 1). In certain embodiments, the connection between the hardware switch and the second CPU is established using an interface (e.g., interface 130b of FIG. 1). The interface may be a serial terminal interface such as a UART. Method 200 then moves from step 230 to step 235, where the console port receives another character stream. For example, the user may input another character stream into the periphery device (e.g., a keyboard) that is connected to the port. Method 200 then moves from step 230 to step 235, where the hardware switch again determines whether the character stream includes the special character. In certain embodiments, the special character is the same special character as used in step 225. In some embodiments, the special character may be a different special character than used in step 225. For example, the special character may have been changed from a first function (e.g., CTRL-O) to a second function (e.g., CTRL-P).

If, at step 240, the hardware switch detects the special character within the character stream, method 200 moves from step 240 to step 245. If, at step 240, the hardware switch does not detect the special character within the character stream, method 200 moves from step 240 back to step 235, where the hardware switch continues to receive character streams until the hardware switch detects the special character within the character stream. Method 200 then moves from step 240 to step 245, where the hardware switch switches the console port connection from the second CPU back to the first CPU. Method 200 then moves from step 245 to step 250, where method 200 ends.

Although this disclosure describes and illustrates an example method 200 for switching a console connection between CPUs including the particular steps of the method of FIG. 2, this disclosure contemplates any suitable method 200 for switching a console connection between CPUs, including any suitable steps, which may include all, some, or none of the steps of the method of FIG. 2, where appropriate. For example, method 200 may include additional steps directed to connecting the console port to a third CPU (e.g., CPU-2 of FIG. 1). As another example, method 200 may include additional steps directed to changing the special character from a first special character to a second special character.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates particular components, devices, or systems carrying out particular steps of method 200 of FIG. 2, this disclosure contemplates any suitable combination of any suitable components, devices, or systems carrying out any suitable steps of method 200 of FIG. 2.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a Wi-Fi network, a Wi-MAX network, a cellular telephone network (such as, for example, a Global System for Mobile Communications (GSM) network, a 3G/Universal Mobile Telecommunications Service (UMTS) network, a LTE network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A hardware switch, comprising:
   one or more processors; and
   one or more computer-readable non-transitory storage media coupled to the one or more processors and comprising instructions that, when executed by the one or more processors, cause the hardware switch to perform operations comprising:
      establishing a connection between the hardware switch and a console port;
      connecting the console port to a first central processing unit (CPU) of a plurality of CPUs using a physical circuitry component of the hardware switch;
      receiving, from the console port, a first character stream;
      detecting a first special character within the first character stream;
      selecting, in response to detecting the first special character within the first character stream and independent of a particular control mode of operation, a second CPU from the plurality of CPUs based on a predetermined, recurring order of the plurality of CPUs; and
      connecting, in response to detecting the first special character within the first character stream, the console port to the second CPU using the physical circuitry component of the hardware switch.

2. The hardware switch of claim 1, the operations further comprising:
   receiving, from the console, a second character stream;
   detecting the first special character within the second character stream; and
   connecting, in response to detecting the first special character within the second character stream, the console port to a third CPU.

3. The hardware switch of claim 2, wherein the third CPU is the first CPU.

4. The hardware switch of claim 1, the operations further comprising:
   changing the first special character to a second special character;
   receiving, from the console, a second character stream;
   detecting the second special character within the second character stream; and
   connecting, in response to detecting the second special character within the second character stream, the console to a third CPU.

5. The hardware switch of claim 1, the operations further comprising communicating, after connecting the console port to the second CPU, with the second CPU using a serial terminal interface.

6. The hardware switch of claim 5, wherein the serial terminal interface is a universal asynchronous receiver-transmitter (UART).

7. The hardware switch of claim 1, wherein the hardware switch is part of an asymmetric multi-processing (AMP) system.

8. A method, comprising:
establishing a connection between a hardware switch and a console port;
connecting, by the hardware switch, the console port to a first central processing unit (CPU) of a plurality of CPUs using a physical circuitry component of the hardware switch;
receiving, from the console port, a first character stream;
detecting, by the hardware switch, a first special character within the first character stream;
selecting, in response to detecting the first special character within the first character stream and independent of a particular control mode of operation, a second CPU from the plurality of CPUs based on a predetermined, recurring order of the plurality of CPUs; and
connecting, by the hardware switch, the console port to the second CPU in response to detecting the first special character within the first character stream using the physical circuitry component of the hardware switch.

9. The method of claim 8, further comprising:
receiving, from the console, a second character stream;
detecting, by the hardware switch, the first special character within the second character stream; and
connecting, by the hardware switch, the console port to a third CPU in response to detecting the first special character within the second character stream.

10. The method of claim 9, wherein the third CPU is the first CPU.

11. The method of claim 8, further comprising:
changing the first special character to a second special character;
receiving, from the console, a second character stream;
detecting the second special character within the second character stream; and
connecting, in response to detecting the second special character within the second character stream, the console to a third CPU.

12. The method of claim 8, further comprising communicating, after connecting the console port to the second CPU, with the second CPU using a serial terminal interface.

13. The method of claim 12, wherein the serial terminal interface is a universal asynchronous receiver-transmitter (UART).

14. The method of claim 8, wherein the hardware switch is part of an asymmetric multi-processing (AMP) system.

15. One or more computer-readable non-transitory storage media embodying instructions that, when executed by a processor, cause the processor to perform operations comprising:
establishing a connection between a hardware switch and a console port;
connecting the console port to a first central processing unit (CPU) of a plurality of CPUs using a physical circuitry component of the hardware switch;
receiving, from the console port, a first character stream;
detecting a first special character within the first character stream;
selecting, in response to detecting the first special character within the first character stream and independent of a particular control mode of operation, a second CPU from the plurality of CPUs based on a predetermined, recurring order of the plurality of CPUs; and
connecting, in response to detecting the first special character within the first character stream, the console port to the second CPU using the physical circuitry component of the hardware switch.

16. The one or more computer-readable non-transitory storage media of claim 15, the operations further comprising:
receiving, from the console port, a second character stream;
detecting the first special character within the second character stream; and
connecting, in response to detecting the first special character within the second character stream, the console port to a third CPU.

17. The one or more computer-readable non-transitory storage media of claim 16, wherein the third CPU is the first CPU.

18. The one or more computer-readable non-transitory storage media of claim 15, the operations further comprising:
changing the first special character to a second special character;
receiving, from the console port, a second character stream;
detecting the second special character within the second character stream; and
connecting, in response to detecting the second special character within the second character stream, the console port to a third CPU.

19. The one or more computer-readable non-transitory storage media of claim 15, the operations further comprising communicating, after connecting the console port to the second CPU, with the second CPU using a serial terminal interface.

20. The one or more computer-readable non-transitory storage media of claim 19, wherein the serial terminal interface is a universal asynchronous receiver-transmitter (UART).

* * * * *